April 15, 1958  C. B. HALE  2,830,430
DUAL ACTION RAKE
Filed Oct. 2, 1956  2 Sheets-Sheet 1
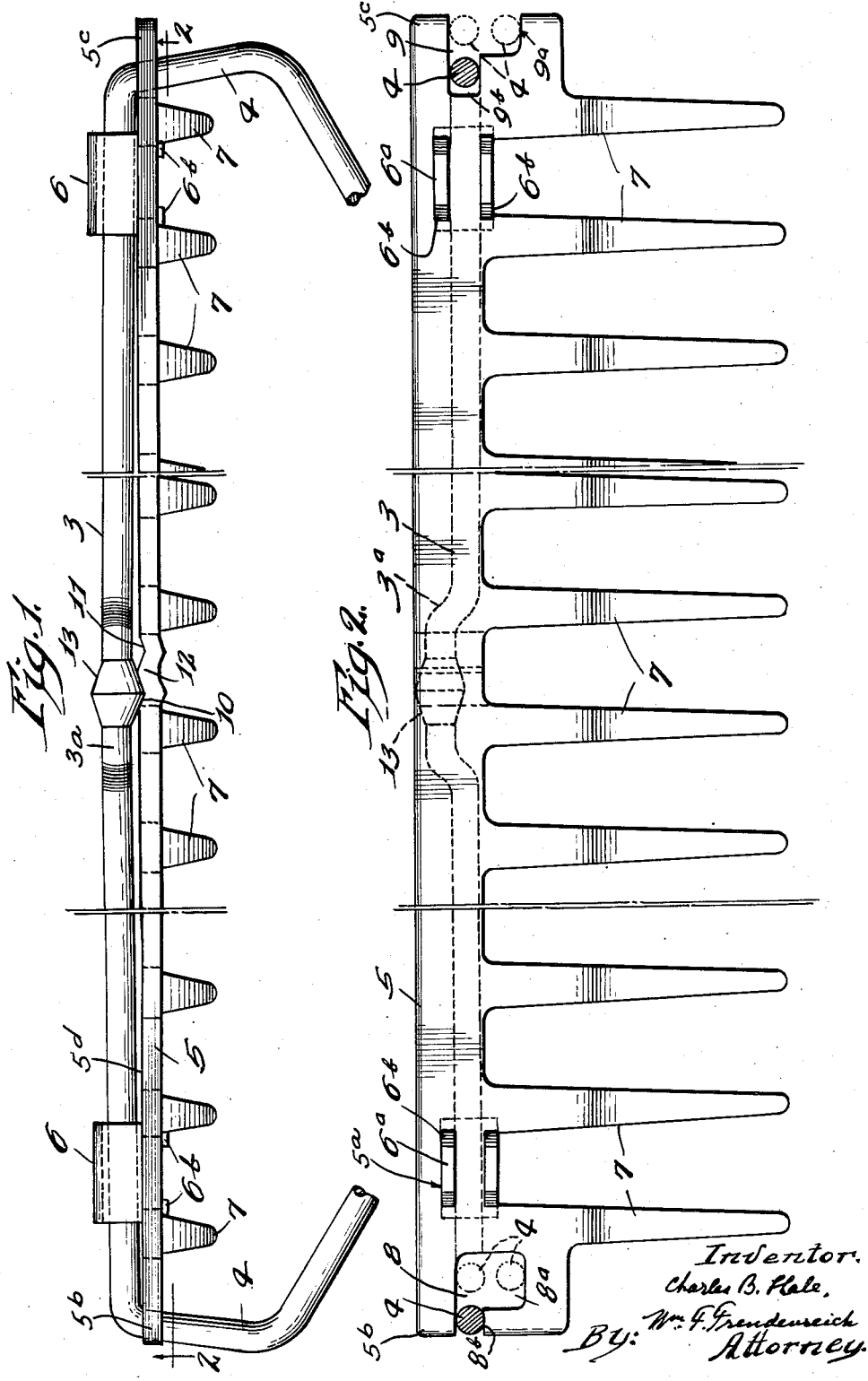

April 15, 1958 C. B. HALE 2,830,430
DUAL ACTION RAKE
Filed Oct. 2, 1956 2 Sheets-Sheet 2
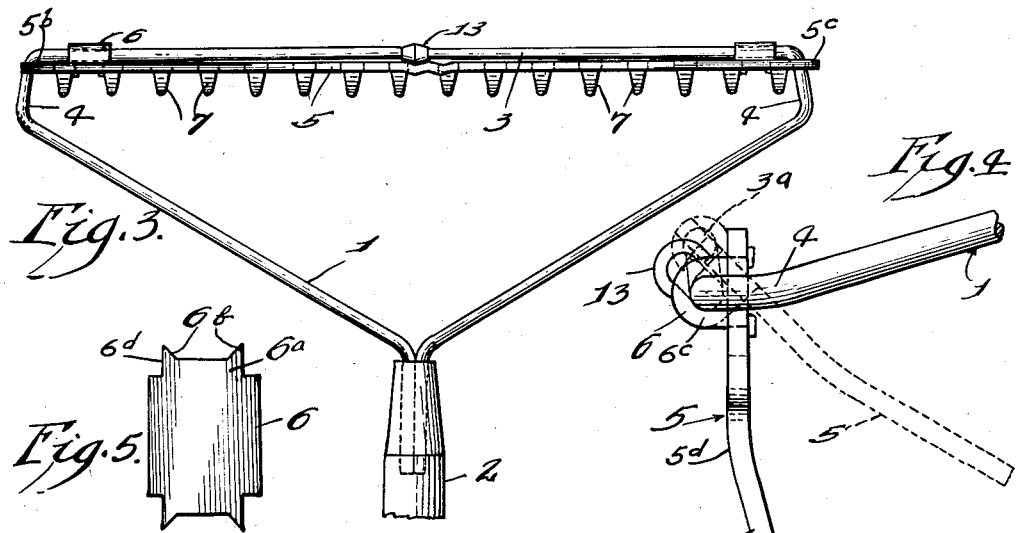
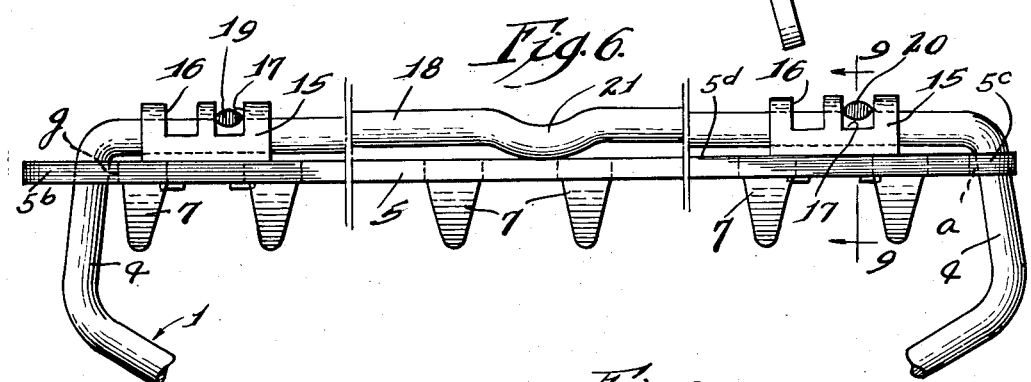
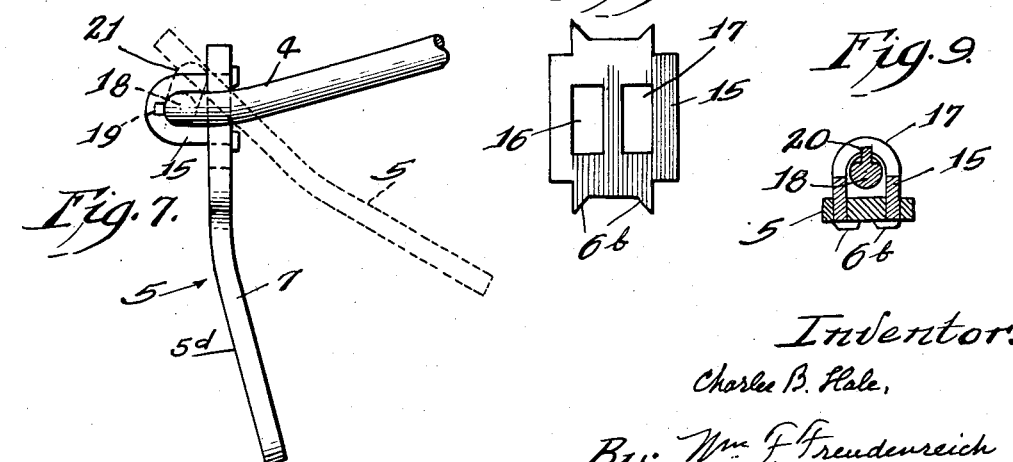
Inventor.
Charles B. Hale,
By: Wm. F. Freudenreich
Attorney.

United States Patent Office 2,830,430
Patented Apr. 15, 1958

2,830,430
DUAL ACTION RAKE

Charles B. Hale, Lakeland, Fla., assignor of one-third to Betty L. Hale, New York, N. Y., and one-third to Virginia H. Humphries, Bennington, Vt.

Application October 2, 1956, Serial No. 613,535

12 Claims. (Cl. 56—400.2)

Hand rakes have heretofore been constructed so that the teeth may swing into positions that permit them to slide over the ground when the rakes are pushed forward. This is advantageous for some raking operations but renders the rakes ineffective in situations where teeth immovable with respect to the rake handles are needed; and, consequently, it has heretofore been necessary for a person to have two rakes in order to avail himself of the advantages of both of these types.

The purpose of the present invention is to produce a rake embodying in a single structure the characteristics of both of the aforesaid types.

Some of the objects of the invention are to produce a rake that shall be simple and inexpensive, contain no movable parts except the toothed head, be rugged and durable, and be instantly, and without the use of tools, adjustable to give it the characteristic of a rigid rake or one adapted to idle on the forward stroke.

The various features of novelty whereby the present invention is characterized will hereinafter be pointed out with particularity in the claims; but, for a full understanding of the invention and its various objects and advantages, reference may be had to the following detailed description taken in connection with the accompanying drawings, wherein:

Fig. 1 is a top plan view of forward or head end of a rake embodying a preferred form of the invention, portions being broken away.

Fig. 2 is a section on line 2—2 of Fig. 1, the teeth being shown in elevation.

Fig. 3 is a plan view, on a smaller scale, showing the complete head end of the rake.

Fig. 4 is an end view looking at the left hand end of Fig. 1, showing the head in full lines in raking position and in broken lines in the idling or cleaning position.

Fig. 5 is a plan view of one of the hinge members in a flat state.

Fig. 6 is a view, similar to Fig. 1, showing a slight modification.

Fig. 7 is an end view, similar to Fig. 4, looking at the left hand end of Fig. 6.

Fig. 8 is a plan view of one of the hinge members, in a flattened state, used in Fig. 6.

Fig. 9 is a section on line 9—9 of Fig. 6.

Referring to Figs. 1–5 of the drawings, 1 represents a head support in the form of a frame or body member formed of heavy, hard wire bent itno a triangular shape, with the meeting ends of the wire at the apex of the triangle connected to handle 2.

The base element 3 of the triangle constitutes a cross piece or member which is joined to the other two converging sides of the triangle by short rearwardly extending elements 4, 4 that diverge from each other; thereby gradually increasing the width of the body member for a short distance behind the cross piece.

Located behind the cross piece, namely, within the triangular body member, is a head member 5 consisting of a flat, toothed, comb-like plate. The plate is secured to the cross piece by means of U-shaped elements 6 which embrace the latter; the arms 6$^c$ of each U being abruptly reduced in width near their free ends 6$^d$ to create narrow sections 6$^a$ that extend through slots 5$^a$ in plate 5; these sections terminating in small ears 6$^b$ that are riveted over on the rear side of the plate.

The ends 5$^b$ and 5$^c$ of the head extend beyond the endmost teeth 7 and a provided with notches 8 and 9, respectively, opening out through the end edges of the plate. Both notches are L-shaped, with the long arm 8$^a$ and 9$^a$ of the L being at right angles to the cross piece 3 and being approximately vertical when the rake is in use with the head in raking position. The short arms, 8$^b$ and 9$^b$, of the slots are parallel to the cross piece and so are horizontal during raking operations; they are at the same level, arms 8$^a$ and 9$^a$, 8$^a$ and 9$^a$ extending downwardly from arms 8$^b$ and 9$^b$ respectively, and arm 8$^b$ opens through the end edge of plate 5, while arm 9$^b$ extends inwardly from arm 9$^a$.

Wire elements 4, 4 extend through notches 8 and 9, the parts being so proportioned that plate 5 may be moved lengthwise without permitting it to be disengaged from wire elements 4, 4. The width, in the vertical direction, of notch arms 8$^b$ and 9$^b$ is approximately equal to the diameter of the wire of which the body member is composed. When the plate or head 5 is at the right hand limit of its lengthwise movements as shown in Fig. 2, wire elements 4, 4 are seated in notch arms 8$^b$ and 9$^b$, as shown in full lines in Fig. 2, and therefore, the head is locked against swinging movements. When the head is at the left hand limit of its endwise movements, wire elements 4, 4 are located in the vertically-elongated notch arms 8$^a$ and 9$^a$, so that the head may swing through an angle of 45°.

It may therefore be said that the notches in the ends of the head are shaped to engage wires 4, 4 to lock the head in a fixed raking position or permit a limited swinging movement about the axis of the cross piece.

Some means must be provided to lock the head in each of its two aforesaid positions. In the arrangement shown, the head has on the front side 5$^d$, midway between the ends, two spaced seats or depressions 10 and 11, each in the shape of a flattened V separated by a portion 12 in the form of a flattened, inverted V. Cross piece 3 has at the middle an enlargement 13 in the form of two cone frustums placed base to base. This enlargement snaps into one or the other of said depressions, depending on the direction in which the head is shifted. This locking of the head has no effect on the swinging movements of the head and so the head is free to swing when in the idling position.

The resiliency of the wire in the body member serves to hold the enlargement 14 in the seats, while yielding sufficiently to permit the enlargement to ride over the hump between the two depressions 10 and 11 when the head is pushed lengthwise from one limit to the other. The enlargement is at the middle of a short upwardly bent section 3$^a$ of cross piece and thus exerts pressure against the front of the head at a level above the hinge axis. This pressure results in snapping the head into its upright or conventional position as soon as a forward idling and cleaning movement of the rake ceases.

In Figs. 6–9 there is shown a modified form of lock for holding the head against accidental lengthwise movement. In this construction, each U-shaped hinge element 15 is provided with two slots, 16 and 17, the mid planes of which are at right angles to the cross piece 18. The cross piece is provided with extruded lugs or projections 19 and 20, one opposite each hinge. There is sufficient play in the hinges to enable these projections to force the head away from the cross piece far enough for the projections to slip from either of the two adjacent slots to the other. Each pair of these slots constitutes a pair of seats corresponding to the seats 10 and 11 in the first form of lock. The cross piece in this instance still is provided with a fairly abrupt bend 21 at the middle; this bend engaging the front side of the head and serving as a fulcrum in the stressing of the cross piece.

In using the rake, the head is pushed into the desired position, if it is not already there, and the rake is ready to do the intended work. If during the progress of the work a change is desirable, it can be made instantly. I have found that a swinging movement of 45° when idling on the forward stroke is desired, is satisfactory; but this is not critical.

While I have illustrated and described in detail only a preferred form of the invention, together with a slight modification, I do not desire to be limited to the exact details thus illustrated and described; but intend to cover all forms and arrangements that come within the definitions of the invention, constituting the appended claims.

I claim:

1. A rake comprising a handle, a cross piece attached to the handle, a toothed head mounted on the cross piece so as to be capable of swinging about the axis of the latter and of endwise movements between definite limits, cooperating elements on said head and the cross piece to lock the head in a raking position when at one of said limits and to leave the head free to swing backward from the raking position when at the other of said limits, and cooperating elements on the cross piece and the head automatically engaging each other to lock the head against endwise movement whenever it is at either of said limits.

2. A rake comprising a handle, a cross member attached to the handle, a toothed head member mounted on the cross member so as to be capable of swinging about the axis of the latter and of endwise movements between limits, cooperating elements on said members to lock the head member in a fixed raking position when at one of said limits and to leave the head free to swing backward from the raking position when at the other of said limits, and said members being provided with latching means automatically to lock the head against endwise movement whenever it reaches either of said limits.

3. A rake comprising a handle, a cross member attached to the handle, a toothed head member mounted on the cross member so as to be capable of swinging about the axis of the latter and of endwise movements between limits, cooperating elements on said members to lock the head member in a raking position when at one of said limits and to leave it free to swing backward from the raking position when at the other of said limits; one of said members being provided with spaced seats and the other member having thereon a projection that snaps into one or the other of said seats, depending upon which of said limits is reached by said head member, to lock the head against endwise movement.

4. A rake comprising a body device including a handle and a resilient cross bar member at one end of the handle, a long toothed head member hinged to the bar member in a manner to enable the head member to move lengthwise of the hinge axis, one of said members containing two seats spaced apart lengthwise thereof, the second member being provided with a projection adapted to snap into and be yieldingly held in one or the other of said seats to lock the head member against endwise movement when it is in one or the other of two predetermined positions lengthwise of the bar member; and means on said members to lock the head member against swinging movements when it occupies one of said predetermined positions whereas, when the head member is in the other of said predetermined positions, it is left free to swing back under the bar member.

5. A rake comprising a body device including a handle and a head support at one end of the handle, said support including a cross bar terminating at its ends in rearwardly extending supporting elements, a toothed head located behind the cross bar and having in its ends notches through which the said supporting elements extend, a hinge connection between the head and the cross bar that leaves the head free to move lengthwise relative to the cross bar, and there being shoulders in said notches that engage with said supporting elements to lock the head in a raking position against swinging movements when the head is at one limit of its endwise movements and leave the head free to swing rearwardly from the raking position when the head is at the other limit of its endwise movements.

6. A rake comprising a body device including a handle and a head support at one end of the handle, said support including a cross bar member terminating at its ends in rearwardly extending supporting elements, a toothed head member located behind the cross bar member and having in its ends notches through which said supporting elements extend, a hinge connection between the head member and the cross bar member that leaves said members free to move lengthwise relatively to each other, there being shoulders in said notches that engage with said supporting elements to lock the head member in a raking position against swinging movements when it is at one limit of its endwise movements and leave it free to swing rearwardly from the raking position when at the other limit of its endwise movements; one of said members containing seats spaced apart lengthwise of the same, and the other member having thereon a projection adapted to enter either seat and lock the head member at one or the other of limits of its lengthwise movements.

7. A rake as set forth in claim 6, wherein the cross bar member is resilient and exerts a yielding pressure to hold the projection in the selected seat.

8. A rake as set forth in claim 7, wherein the projection is a ridge extending at least part way around the cross bar member.

9. A rake as set forth in claim 7, wherein the projection is a lug on the cross bar member and the seats are slots in an element on the head member and curved in an arc of a circle about the hinge axis.

10. A rake comprising a body device including a handle and a head support at one end of the handle, said support including a cross bar member terminating at its ends in rearwardly extending supporting elements which diverge from each other for a short distance from the cross bar member, a toothed head member longer than the distance between said supporting elements located behind the cross bar member and having in its ends deep notches through which the latter and its said supporting elements extend, a hinge connection between the head member and the cross bar member that leaves the head member free to move lengthwise relative to the other member, there being shoulders in said notches that engage with cross bar member and said supporting elements to lock the head member in a raking position against swinging movements when the same is at one limit of its endwise movements and leave it free to swing rearwardly from the raking position when it is at the other limit of its endwise movements.

11. A rake as set forth in claim 6, wherein the projection is a ridge extending at least part way around the cross bar member.

12. A rake as set forth in claim 6, wherein the projection is a lug on the cross bar member and the seats are slots in an element of the head member and curved in an arc of a circle about the hinge axis.

References Cited in the file of this patent

UNITED STATES PATENTS

| | | |
|---|---|---|
| 2,162,648 | Slusher | June 13, 1939 |
| 2,211,236 | Kunzelman | Aug. 13, 1940 |
| 2,286,939 | Swanson | June 16, 1942 |